US012488654B1

(12) United States Patent
Cloud et al.

(10) Patent No.: US 12,488,654 B1
(45) Date of Patent: Dec. 2, 2025

(54) ASSIGNING PAYOUT MODIFIERS TO FANTASY SPORTS CONTESTS

(71) Applicant: SidePrize LLC, Atlanta, GA (US)

(72) Inventors: Grant Cloud, Atlanta, GA (US); Robert Landerman, Atlanta, GA (US); Dae Kang, Atlanta, GA (US); Andrew Barron, Atlanta, GA (US); Samuel Garvis, Atlanta, GA (US); Lambert Chu, Atlanta, GA (US); Skyler Kaufman, Atlanta, GA (US)

(73) Assignee: SIDEPRIZE LLC, Atlanta, GA (US)

( * ) Notice: Subject to any disclaimer, the term of this patent is extended or adjusted under 35 U.S.C. 154(b) by 0 days.

(21) Appl. No.: 18/732,010

(22) Filed: Jun. 3, 2024

(51) Int. Cl.
*G07F 17/32* (2006.01)
*A63F 13/828* (2014.01)

(52) U.S. Cl.
CPC .......... *G07F 17/323* (2013.01); *A63F 13/828* (2014.09); *G07F 17/3288* (2013.01); *G07F 17/3276* (2013.01)

(58) Field of Classification Search
CPC ............... G07F 17/323; G07F 17/3276; G07F 17/3288; A63F 13/828
See application file for complete search history.

(56) References Cited

U.S. PATENT DOCUMENTS

2009/0270172 A1* 10/2009 Sorrells .................. A63F 13/30 463/9
2016/0271501 A1 9/2016 Balsbaugh
2020/0009463 A1 1/2020 Brancato
2020/0282314 A1 9/2020 Szeklinski et al.
2020/0357246 A1* 11/2020 Nelson .................. G07F 17/323
2021/0343122 A1 11/2021 Warren
2022/0383704 A1 12/2022 Amaitis et al.
2023/0360492 A1 11/2023 Wexler et al.

OTHER PUBLICATIONS

International Search Report and Written Opinion received in International application No. PCT/US24/32446 mailed on Oct. 10, 2024.

* cited by examiner

*Primary Examiner* — Sunit Pandya
(74) *Attorney, Agent, or Firm* — Bradley Arant Boult Cummings LLP; Adam J. Thompson, Esq.

(57) ABSTRACT

Systems, methods, and devices for dynamically adjusting pricing and associated payouts of fantasy sports contests may utilize one or more computing devices equipped with processors to apply strategic modifiers. Participants may select fantasy sports players and predicted outcomes. A base probability may be determined for the selected players and predicted outcomes. The participants may further apply modifiers (e.g., ranging from a single selection to a combination) to their selection and the base probability may be adjusted to reflect a modified outcome likelihood. Further sophistication may be introduced through consideration of historical performance data and player conditions. Participants may be engaged through a user interface that displays the impact of their modifier choices on potential awards. Entry fees may be calculated and adjusted based on the modified probability of outcomes. Awards may be determined in relation to the modified probability and may be transmitted to participants based on the actual outcomes.

12 Claims, 6 Drawing Sheets

ASSIGNING PAYOUT MODIFIERS TO FANTASY SPORTS CONTESTS

TECHNICAL FIELD

The present disclosure generally relates to systems and methods for selecting squares and creating payouts in line-ups in fantasy sports contests and, more specifically, assigning payout modifiers based on one or more selections by a user.

BACKGROUND

Fantasy sports, a genre of online gaming where participants assemble imaginary or virtual teams composed of proxies of real players of a professional sport, have seen an increase in popularity and engagement in recent years. Fantasy sports platforms allow users to compete against others by building teams based on the performance of the players in actual games. Existing models in fantasy sports platforms provide limited engagement strategies beyond traditional team management and scoring systems. While these platforms offer a robust framework for fantasy sports engagement, they often fail to fully exploit the potential for strategic complexity and the dynamic adjustment of payout scenarios based on how easy or difficult it is to win the specific fantasy sports contest, which could significantly enhance user experience and engagement.

Accordingly, there is an unresolved need for systems and methods for enhancing user engagement and providing dynamic gaming experiences. Moreover, there remains an unresolved need for innovative features that can further enrich the fantasy sports experience, specifically in terms of strategic gameplay and financial incentives.

This background information is provided to reveal information believed by the applicant to be of possible relevance. No admission is necessarily intended, nor should be construed, that any of the preceding information constitutes prior art.

SUMMARY

Briefly described, and in various embodiments, the present disclosure generally relates to fantasy sports contests. Moreover, the present disclosure is particularly relevant to dynamically adjusting the pricing and associated payouts of fantasy sports player picks by applying strategic modifiers, significantly enhancing the strategic gameplay and engagement of fantasy sports platforms. The disclosed system may include a computing infrastructure (e.g., including a include a computing environment, a client device, and various external resources) for dynamically adjusting pricing and payouts through strategic modifiers.

The disclosed system comprises a sophisticated computational model, utilizing a pricing algorithm that dynamically adjusts the pricing of each fantasy sports player's pick. This adjustment is based on the application of strategic modifiers-increased difficulty modifiers ("Demons") and decreased difficulty modifiers ("Goblins")-which affect the true probability of achieving specified outcomes. The disclosed system incorporates a multitude of factors, including player statistics, market-level data, and real-time performance metrics. By doing so, the disclosed system offers a more engaging, strategic fantasy sports experience, integrating computational models in enhancing the dynamics of fantasy sports gaming.

According to some aspects, one or more computing devices equipped with processors may perform one or more operations associated with a fantasy sports contest. In one or more other aspects, a method may include one or more operations associated with facilitating a fantasy sports contest. Moreover, a system may include one or more processors and memory coupled with the one or more processors. The memory may store executable instructions that, when executed by the one or more processors, may cause the one or more processors to effectuate operations associated with one or more operations of a fantasy sports contest.

According to some aspects, selections may be received from participants, which may include chosen fantasy sports players and their anticipated performance outcomes. A base probability may be calculated for the predictions, a selection of a strategic modifier may be received by the participant, and the base probability may be adjusted to derive a modified probability. According to some aspects, multiple modifiers may be received from the participant, each contributing to the calculation of the modified probability. Based on this modified probability, an award (e.g., a payout) may be determined and transmitted to the participant, contingent on the actual outcome of the selection. A user interface may dynamically display the selected modifier and the resultant award (e.g., a payout).

According to some aspects, the base probability of the predicted outcomes may be determined based on the historical performance of the selected fantasy sports players, including a comprehensive analysis of their past performances. The historical performance of the selected fantasy sports players may include a current condition (e.g., physical and psychological state) of each selected player. Utilizing machine learning, determining base probabilities may be refined by learning from past user selections and the outcomes associated with those choices.

According to aspects of the disclosure, the system may comprise a Data Collection and Analysis Module. The Data Collection and Analysis Module may aggregate, process, and analyze vast quantities of data essential for determining true probabilities of various outcomes under the influence of strategic modifiers. One or more of advanced web scraping techniques, API integrations, and/or sophisticated statistical models may assess the impact of numerous factors on player performance. Through real-time data processing and analysis, the Data Collection and Analysis Module may ensure accurate and dynamic adjustment of pricing, reflecting the enhanced difficulty mechanics introduced by the strategic modifiers.

A Dynamic Pricing Adjustment Module may utilize updated probabilities for specified outcomes to calculate and adjust the pricing for picks involving strategic modifiers in real-time. The adjustments may ensure pricing remains competitive and fair, enhancing the overall gaming experience. According to some aspects, the Dynamic Pricing Adjustment Module may utilize one or more adaptive algorithmic frameworks, user interaction tracking, scalable computing resources, and/or robust security measures, e.g., contributing to the precision, scalability, and responsiveness of the pricing adjustments.

Real-time User Interface (UI) Updates may provide immediate visual feedback on the impact of modifier selections on pricing and potential payouts. For example, the disclosed system may utilize one or more of AJAX and/or WebSocket technologies to ensure a seamless and dynamic user experience without the need for page reloads. The system's UI may allow players to easily navigate and understand the implications of their strategic choices, thereby promoting strategic gameplay and maintaining user engagement and satisfaction.

Aspects of the disclosure provide a groundbreaking approach to fantasy sports gaming, introducing a system and method for dynamically adjusting pricing and payouts through strategic modifiers. By incorporating sophisticated computational models, real-time data analysis, and user-centric design, the disclosed system addresses the existing gap in strategic complexity and engagement in fantasy sports platforms. This innovative approach not only enhances the gaming experience but also sets a new benchmark for the integration of technology in fantasy sports, promising a more engaging, fair, and strategically complex platform for users.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE FIGURES

Reference will now be made to the accompanying drawings, which are not necessarily drawn to scale.

Figure 1:
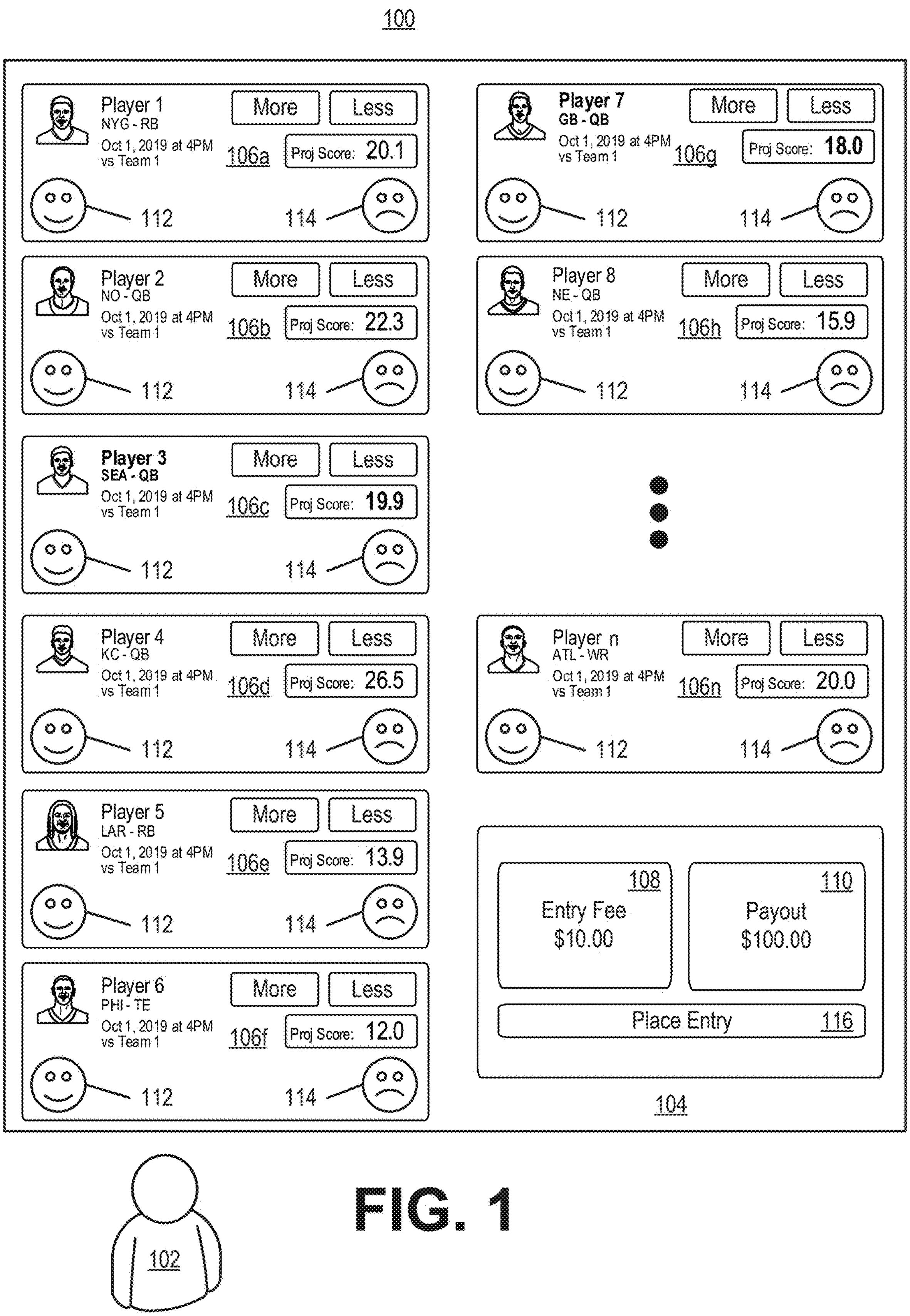
FIG. 1 illustrates an exemplary player selection interface according to various embodiments of the present disclosure.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Prior to a detailed description of the disclosure, the following definitions are provided as an aid to understanding the subject matter and terminology of aspects of the present systems and methods, are exemplary, and not necessarily limiting of the aspects of the systems and methods, which are expressed in the claims. Whether or not a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

User. A consumer interacting with a particular product (e.g., a fantasy sports contest).

Operator. An entity representing a contest (e.g., a fantasy sports contest) operator or organizer.

Lineup. The collection of squares submitted by a user into the operator's contest in an attempt to win the contest's prize.

Square. A single component of a lineup, based on the performance of an individual player or a combination of players.

Offer. A submission of a lineup made to the contest operator.

Correlation. The degree to which two or more quantities are quantitatively related to one another.

Correlation Value. A measurement of correlation which may be a number between 1 and −1. A number close to 1 may mean two factors are positively correlated (e.g., they may rise or fall together and at a similar magnitude), a number close to −1 may mean the two factors are oppositely correlated (e.g., they may rise or fall oppositely and at a similar magnitude), and a number closer to 0 may mean that the two factors may be mostly random to each other, therefore not significantly correlated.

Related Contingencies. Any lineup comprising squares within a correlation value that is not equal to zero (e.g., a related contingency may be any lineup that comprises square (s) associated with any sort of dependent event).

Payout. An amount of value, relative to the lineup and associated entry fee, which will be rewarded upon a win.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Referring now to the figures, for the purposes of example and explanation of the fundamental processes and components of the disclosed systems and processes, reference is made to FIG. 1, which illustrates an environment 100 for a fantasy sports contest including a player selection interface 104. As will be understood and appreciated, the player selection interface 104 shown in FIG. 1 represents merely one approach or embodiment of the present concept, and other aspects are used according to various aspects of the present concept.

According to some aspects, the environment 100 for a fantasy sports contest may comprise a comprehensive platform catering to the nuanced needs of fantasy sports enthusiasts (e.g., user 102). As shown in FIG. 1, a player selection interface 104 may provide an interface for user 102 to delve into the strategic aspects of fantasy sports by selecting a number (e.g., n) of players (e.g., players 106*a*-106*n*), cumulatively referred to as players 106, for their lineups. Users 102 may interact with the player selection interface 104 through a variety of client devices (e.g., client device 350 illustrated in FIG. 3), broadening accessibility and ensuring that user 102 may engage with the player selection interface 104 from any number of devices or locations.

The player selection interface 104 may render a roster of players 106, each participating in a myriad of sporting events across different leagues and tournaments. For example, the players 106 may include one or more of athletes from major leagues such as the National Football League (NFL), Major League Baseball (MLB), National Hockey League (NHL), as well as esports competitors from League of Legends and soccer players from global competitions like La Liga and the Champions League. The diversity of players 106 may ensure that user 102 has a broad spectrum of options for creating their lineups, ranging from predicting a soccer player's performance in the Major League Soccer (MLS) league to predicting outcomes for a baseball player in the World Series. The player selection interface 104 may allow for the inclusion of players 106 involved in events on the same day, distinct days, or multiple instances of the same player across different events, providing user 102 with flexibility in lineup creation.

The player selection interface 104 may prompt the user 102 to make predictions on outcomes based on associated events, introducing a strategic layer to the selection process. Outcomes may be presented as selectable results, such as predicting whether a football quarterback will throw more or less than three touchdowns in an upcoming game. This system of outcome selection may be further enriched with options for occurrence and non-occurrence selections (e.g., 'More' or 'Less'). Such detailed prognostication opportunities may empower user 102 to engage deeply with the sports they love, challenging their analytical skills and understanding of each sport's nuances.

Lineup selection within the player selection interface 104 may introduce another strategic dimension, where user 102 may define the size of their lineup, choosing from a range of squares that may include two or more players and their associated events. User 102 may weigh the likelihood of correctly predicting outcomes across a larger set of selections against the potential for higher rewards. This balance between the likelihood of winning and the variance in the payout multiplier may enhance the appeal of the fantasy sports contest, offering a compelling challenge. Upon selecting their lineup, user 102 may be prompted to choose an entry fee 108, with the interface displaying the potential payout 110 associated with their selections and the chosen entry fee 108.

The player selection interface 104 may incorporate one or more increased difficulty modifiers 112 (e.g., "Demons") and/or decreased difficulty modifiers 114 (e.g., "Goblins"). Selection of the one or more increased difficulty modifiers 112 (e.g., "Demons") and/or decreased difficulty modifiers 114 (e.g., "Goblins") may dynamically adjust the potential payout 110 based on the user's selections. The one or more increased difficulty modifiers (e.g., "Demons") and/or decreased difficulty modifiers (e.g., "Goblins") may introduce an additional layer of strategic depth, allowing user 102 to tailor their gaming experience according to their strategic preferences. Upon selecting their lineup of players 106 and one or more increased difficulty modifiers (e.g., "Demons") and/or decreased difficulty modifiers (e.g., "Goblins"), user 102 may be provided with immediate feedback on the potential payout (110), which may be influenced by the applied difficulty modifiers.

The application of increased difficulty modifiers 112 ("Demons") may escalate the challenge by enhancing the difficulty level of the selected outcomes, thereby potentially increasing the payout 110 due to the higher difficulty involved. Conversely, the use of decreased difficulty modifiers 114 ("Goblins") may lower the challenge by reducing the difficulty of achieving the selected outcomes, which might result in a lower potential payout 110 reflecting the diminished difficulty. This nuanced approach may empower user 102 to manipulate the difficulty of winning the fantasy contest, offering a personalized contest experience that caters to the diverse preferences of the fantasy sports community.

The inclusion of a submission selection 116 may allow users to finalize and submit their entry into the contest, marking the culmination of their strategic deliberations. By providing the users 102 with detailed information regarding their selected projections, the player selection interface 104 may ensure that users 102 are fully informed of the potential payouts, fostering an environment of transparency and strategic engagement.

Figure 2:
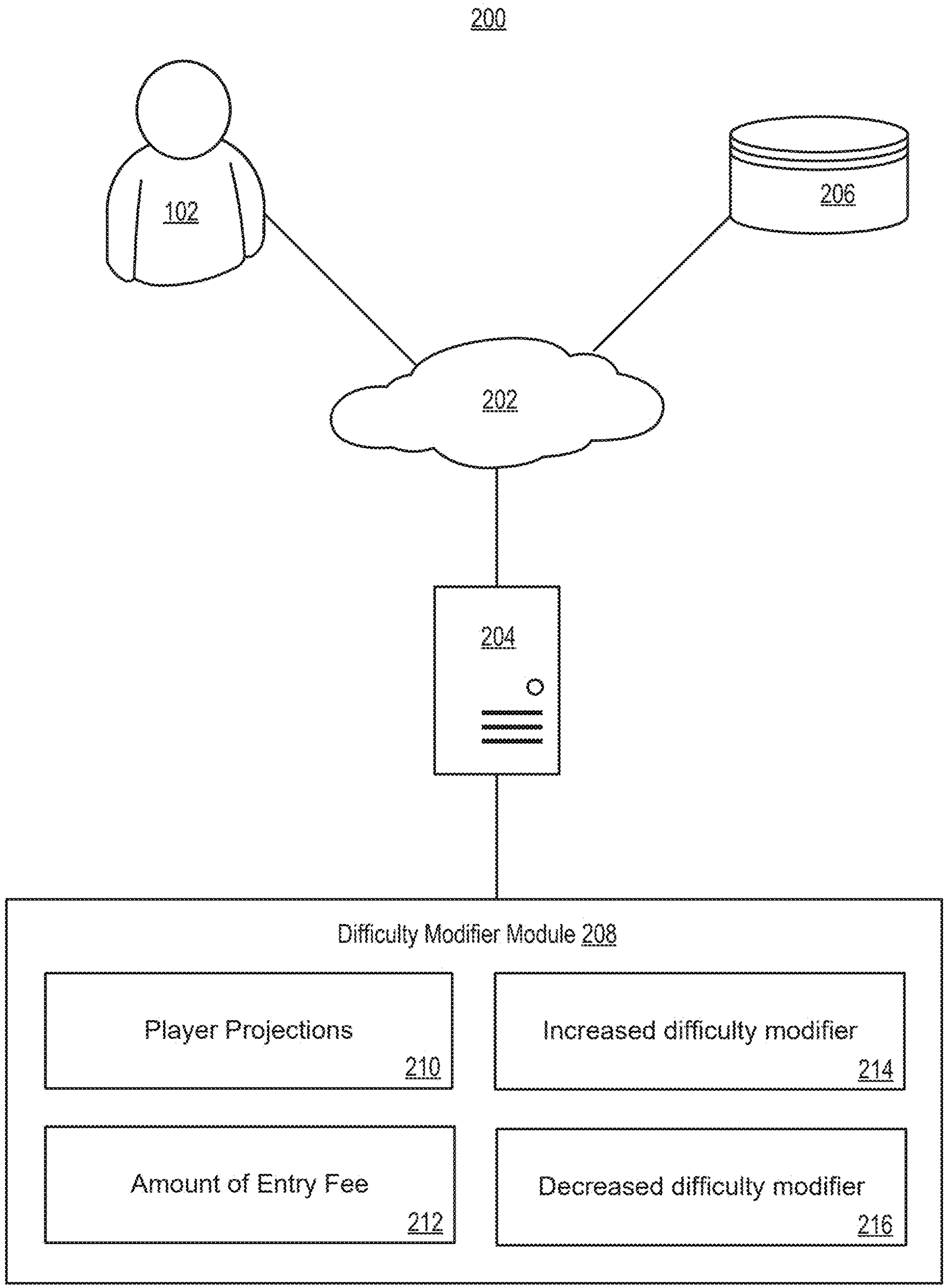
FIG. 2 illustrates an exemplary networked environment according to various embodiments of the present disclosure.

As shown in FIG. 2, an environment 200 for a fantasy sports contest may facilitate interactive fantasy gaming for a user 102. The environment 200 may include a network 202, a server 204, and a database 206. The individual elements of the environment 200, working in concert, may deliver a seamless and engaging fantasy sports experience, leveraging advanced algorithms and data analytics to apply one or more increased difficulty modifiers 112 (e.g., "Demons") and/or decreased difficulty modifiers 114 (e.g., "Goblins") to dynamically adjust the potential payout 110 based on the user's selections.

The network 202 may provide a versatile and dynamic conduit that enables communication and data exchange across the environment 200. The network 202 may encompass a wide range of connection types, including wired, wireless, and cloud-based technologies, ensuring that user 102 may access the fantasy sports contest platform from virtually anywhere. This connectivity may support real-time interactions and updates, allowing user 102 to make informed decisions based on the latest available information, ranging from player performance data to changes in contest dynamics.

According to some aspects, the server 204 may act as a central processing unit within the environment 200, orchestrating the myriad operations necessary to run the fantasy contests efficiently. The server 204 may handle tasks ranging from user authentication and data processing to the execution of complex algorithms utilized by a difficulty modifier module 208. Moreover, the server 204 may manage flow of information between user 102 and the system, ensuring that user selections, lineups, and other inputs are accurately recorded and reflected in the contest outcomes.

The database 206 may store a vast array of information associated with the operation of the fantasy sports contests. For example, the database 206 may comprise one or more of user profiles, player statistics, contest results, and other data points. By maintaining a comprehensive and up-to-date repository of information, the database 206 may enable the server 204 to perform detailed analyses and make informed decisions regarding application of one or more increased difficulty modifiers 112 (e.g., "Demons") and/or decreased difficulty modifiers 114 (e.g., "Goblins") to dynamically adjust the potential payout 110 based on the user's selections.

Database 206 may comprise a diverse range of data essential for the enriched operation of fantasy sports contests. Among the stored within database 206 may be user profiles, encapsulating the demographic and behavioral patterns of the users but also their historical interaction with the platform, including past entries, selections, and difficulty preferences. This aggregation of user-centric information enables server 204 to tailor contest dynamics to individual preferences, enhancing user engagement through personalized difficulty scenarios.

The database 206 may archive player statistics, including comprehensive performance metrics across various sports and competitions. These statistics may cover an extensive array of metrics, from basic game-day performance scores to advanced analytics. The depth and breadth of the player statistics may be utilized by the algorithmic determinations made by server 204 when adjusting the increased difficulty modifiers 112 and the decreased difficulty modifiers 114. The granular detail within these statistics may permit nuanced analysis, allowing for precise modulation of potential payouts in reflection of current player forms and historical performance trends.

Contest results stored within database 206 may serve as a historical ledger of the outcomes of fantasy sports contests. This repository may not only foster transparency and trust in the platform by providing an auditable trail of past contests and their outcomes but may also serve as a dataset for predictive modeling and trend analysis. By analyzing these outcomes, server 204 may discern patterns, identify anomalies, and refine the application of difficulty modifiers to align with evolving contest dynamics and user strategies, ensuring fairness and competitiveness within the platform.

An assortment of other data points housed within database 206 may include market trends, sports event schedules, real-time sports news, and injury reports, amongst others. This data may be used by one or more adaptive algorithms employed by server 204. Real-time sports news and injury reports, for example, may have immediate impacts on player statistics and contest outcomes, necessitating swift adjustments to difficulty modifiers and contest parameters to maintain an equitable contest environment. Market trends, on the other hand, may provide insights into user behavior and preferences, influencing the strategic deployment of difficulty modifiers to enhance user engagement and platform loyalty.

The difficulty modifier module 208 may be a software component and/or a specialized component, operating with the server 204 or within the server 204. Using advanced algorithms, the difficulty modifier module 208 may evaluate and analyze statistics associated with one or more of the selected player projections 210, the amount of entry fee 212, one or more increased difficulty modifiers 214 (e.g., "Demons"), and/or decreased difficulty modifiers 216 (e.g., "Goblins"). The difficulty modifier module 208 may ensure that the appropriate adjustments are applied to the entry of the user 102 based on the selected player projections 210, the amount of entry fee 212, the one or more increased difficulty modifiers 214 (e.g., "Demons"), and/or the decreased difficulty modifiers 216 (e.g., "Goblins"), promoting a fair and enjoyable gaming experience for all participants.

The difficulty modifier module 208 may facilitate intricate functions of evaluating and adjusting the parameters that govern the dynamics of contest entry, including reward allocation. The difficulty modifier module 208 may employ a series of algorithms designed to analyze player projections 210, entry fees 212, and applied difficulty modifiers, both increased difficulty modifiers 214 ("Demons") and decreased difficulty modifiers 216 ("Goblins"). By synthesizing this data, the difficulty modifier module 208 may dynamically modulate the potential payout, ensuring that operator exposure remains balanced and tailored to the strategic selections made by the user 102.

The difficulty modifier module 208 may perform a plurality of functions, including evaluation of selected player projections 210. For example, the difficulty modifier module 208 may analyze one or more of historical performance data, current season statistics, and any relevant real-time information that may impact a player's expected performance. The difficulty modifier module 208 may contrast the projections against collective wisdom of the platform's user base and external market trends to gauge accuracy and potential outcome of user selections. The evaluation may provide enhanced insight into the underlying difficulty associated with each player projection, forming a basis upon which difficulty modifiers are applied.

Upon analyzing the player projections, the difficulty modifier module 208 may scrutinize the entry fee 212 in conjunction with the selected difficulty modifiers, be they increased difficulty modifiers 214 or decreased difficulty modifiers 216. This scrutiny may allow the module to algorithmically calculate the potential payout, adjusting it in real-time based on the level of difficulty the user is willing to undertake. Increased difficulty modifiers ("Demons") may elevate the challenge by augmenting the statistical thresholds needed for a winning outcome, thereby warranting a higher potential payout. Conversely, decreased difficulty modifiers ("Goblins") may lower these thresholds, making it easier to achieve a win but resulting in a correspondingly lower payout.

Algorithms employed by the difficulty modifier module 208 may incorporate a fairness assessment mechanism, ensuring that the application of difficulty modifiers does not disproportionately favor or disadvantage any participant. The fairness assessment may include calibration to match the user's strategic decisions accurately, fostering an equitable contest environment. By monitoring the impact of each modifier in real-time and adjusting contest parameters accordingly, the difficulty modifier module 208 may guarantee that every entry fee paid, and potential payout calculated reflects a fair assessment of the user's chosen difficulty level and player projections.

The difficulty modifier module 208 may enhance the gaming experience by promoting strategic engagement and decision-making among participants. By providing a transparent and adaptable framework for applying difficulty modifiers, the difficulty modifier module 208 may encourage users to delve deeper into their understanding of the sports and the players. This may not only make the fantasy sports contest more enjoyable and engaging but may also elevate the overall quality of participation, as users are incentivized to make well-informed, strategic decisions. In doing so, the difficulty modifier module 208 may facilitate sustaining a vibrant, competitive, and fair fantasy sports ecosystem that appeals to a wide range of enthusiasts seeking both entertainment and the thrill of strategic sports gaming.

Figure 3:
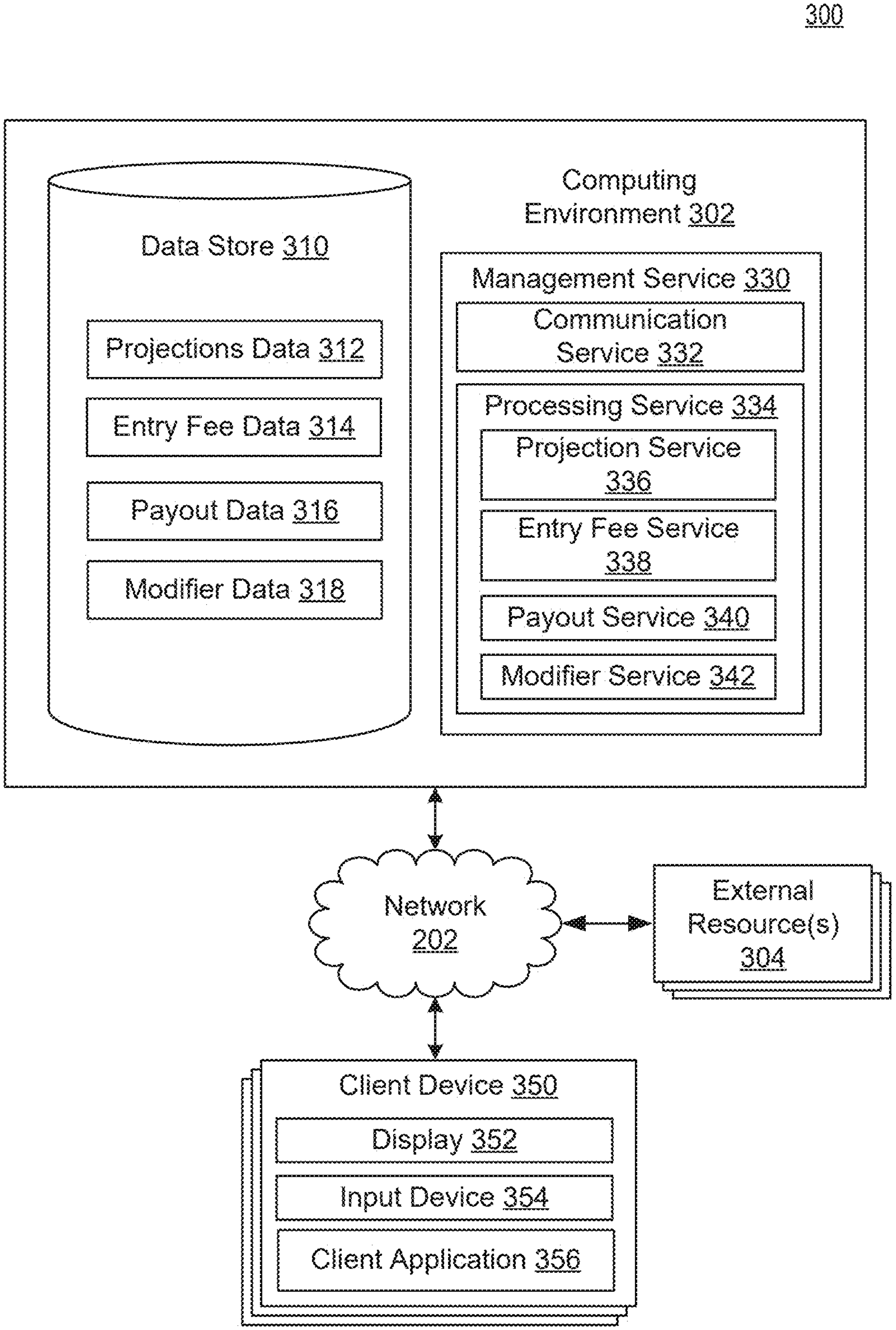
FIG. 3 illustrates an exemplary networked environment according to various embodiments of the present disclosure.

As shown in FIG. 3, the networked environment 300 may facilitate fantasy sports contests, leveraging advanced algorithms and data analytics to apply one or more increased difficulty modifiers 112 (e.g., "Demons") and/or decreased difficulty modifiers 114 (e.g., "Goblins") to dynamically adjust the potential payout 110 based on the user's selections. This networked environment 300 may include a computing environment 302, various external resources 304, and client devices 350, one or more of which may be interlinked via a network 202. Network 202, including one or more of the Internet, LANs, WANs, and wireless connections, may provide communication within the networked environment 300, including real-time data exchanges, updates, and interactions.

The computing environment 302 may operate within a single device or may span across multiple devices or servers. These devices, potentially distributed across different locations, may work collectively to process, administer, and manage the functionalities associated with the fantasy contests. Moreover, the computing environment 302 may adapt to the computational demands, making it an elastic resource capable of scaling according to the operational needs of the fantasy sports platform. It handles crucial tasks such as lineup processing, outcome determinations, payouts distributions, and analytical data management, positioning it as the central node of the networked environment.

The data store 310 may serve as a repository for an array of data types associated with the fantasy contest's operation, including projections data 312, entry fee data 314, payout data 316, modifier data 318, and various other datasets that may contribute to the fantasy gaming experience. Each dataset may be used to facilitate the dynamic adjustment of entry fees and potential payouts based on the user's selections, including the application of difficulty modifiers. The projections data, for example, may encompass detailed information about athletes that users may leverage to make informed decisions when forming their fantasy lineups. This includes performance statistics, team affiliations, and event-specific data that are essential for the analytical algorithms to evaluate and apply the appropriate difficulty level and potential payouts.

Projections data 312 may include detailed information about the athletes around which the fantasy sports contests revolve. Projections data 312 may include performance statistics, team affiliations, and event-specific data that user 102 may leverage to make informed decisions when forming their fantasy lineups. By pulling in this data from external resources 304, the computing environment 302 may ensure that user 102 has access to current and comprehensive player information.

According to some aspects, projections data 312 may include identification and contextual information about athletes, including but not limited to, the player's name, the team they represent, the sport they participate in, and their specific role or position within the team. This athlete information may be associated with allowing user 102 to recognize and select players based on team compositions, individual preferences, or strategic considerations aimed at optimizing their fantasy team's performance. Projections data 312 may further integrate a broad spectrum of performance statistics for each athlete. These statistics may provide quantitative measures of a player's contributions to their team's efforts, including scoring, assists, defensive achievements, and other relevant performance metrics. Detailed statistical information may enhance the fantasy sports experience by influencing the points accrued by users' fantasy teams based on real-world athlete performances.

To further enrich the decision-making process, projections data 312 may include additional contextual variables that may influence an athlete's performance. These contextual variables may include data on a player's teammates, the leagues and competitions they are involved in, and upcoming sporting events they are scheduled to participate in. This additional layer of information may offer user 102 insights into the dynamics of team synergy, the competitive landscape of various leagues, and the strategic importance of specific events, all of which may inform more nuanced player selection strategies. Moreover, projections data 312 may account for environmental factors such as the geographical location of sporting events and prevailing weather conditions, recognizing their potential impact on game outcomes and individual performances. For example, athletes may exhibit varying performance levels under different weather conditions or at specific venues, influencing the strategic selection of players for fantasy teams.

Historical performance data and analytics included in projections data 312 may afford user 102 a deeper exploration into an athlete's performance trends and potential. Historical data may highlight patterns and consistency in performances over time, while analytics may offer predictive insights, equipping the user 102 with advanced tools to gauge future performance probabilities. Projection data 314 may be dynamically maintained, with continuous updates from a variety of external resources 304, such as sports statistics databases, event data feeds, and gaming platforms, ensuring that the platform delivers the most current and comprehensive player information possible, enabling users to base their fantasy team selections on the latest available data.

Projection data 316 and entry fee data 314 further refine the contest dynamics by encapsulating the predictive aspects of the contests and the financial commitments made by users. These data points may influence the formation of lineups and the structuring of contest payouts, making them fundamental to the strategic depth of the fantasy contests.

Projections data 312 may encompass selections made by user 102 concerning player performances within the framework of fantasy sports contests. This dataset may include a collection of users' predictions on various aspects of athletes' performances in upcoming games, including, but not limited to, points scored, yards gained, goals made, assists, rebounds, and other sport-specific performance metrics. These projections reflect the users' expectations and strategic choices, based on their analysis or intuition about future sports events.

The projections data 312 may be associated with calculating potential outcomes, and determining payouts based on the accuracy of these user-generated projections. Each entry in the projections data 312 may be linked to increased difficulty modifiers 112 (e.g., "Demons") and decreased difficulty modifiers 114 (e.g., "Goblins"), serving as an input for algorithms that assess associated modifications to difficulty, entry fees, and payouts, contributing to the overall gaming strategy. By aggregating and analyzing these user selections, the system may offer insights into popular trends, potential sleeper picks, and widely anticipated outcomes, enriching the community's collective intelligence.

Projections data 312 may be continuously updated with new user selections and may be maintained to ensure data integrity and relevance. Initial projections may be captured, as well as accommodating changes users might make up to a cut-off time before the actual sporting events, reflecting late-breaking news or last-minute strategic adjustments. As such, projections data 312 may evolve with the sports calendar and the participatory dynamics of the fantasy sports contests, serving as a component of the platform's engagement mechanics and its appeal to users seeking a deeply interactive and competitive fantasy sports experience.

Entry fee data 314 may include data associated with the selection of entry fees by user 102 for participation in fantasy sports contests. The entry fee data 314 may represent the financial engagement of user 102 with the platform, recording the entry fees that user 102 is willing to commit to compete in various fantasy contests. Entry fee data 314 may capture the amount selected by each participant and may provide data for the economic model of the fantasy sports platform. By aggregating these financial commitments, the system may balance the increased difficulty modifiers 112 (e.g., "Demons") and the decreased difficulty modifiers 114 (e.g., "Goblins") with associated entree fees and payouts, tailoring contests to meet diverse user preferences.

Moreover, entry fee data 314 may serve an input for several operational and analytical processes within the system. The entry fee date may be used in the calculation of contest payouts, ensuring that winnings are distributed based on predefined criteria reflective of the contest's entry fees, lineup selections and participant performance. Furthermore, entry fee data 314 may reflect increased difficulty modifiers (e.g., "Demons") and decreased difficulty modifiers (e.g., "Goblins").

Payout data 326 may be determined based on increased difficulty modifiers 112 (e.g., "Demons") and decreased difficulty modifiers 114 (e.g., "Goblins"). Payout data 326 may comprise information regarding the potential financial rewards that users stand to gain based on their contest entries, including the selection of players and the application of difficulty modifiers to these selections. This data may be dynamically adjusted and calculated based on a complex interplay between user-selected difficulty modifiers, the entry fees committed by users, and the performance projections for the athletes involved. The application of difficulty modifiers may influence the potential payouts, with "Demons" generally increasing the difficulty and, consequently, the potential payouts, while "Goblins" may decrease the difficulty along with the potential payouts.

The storage of payout data 326 may be structured to accommodate the variability introduced by the difficulty modifiers, ensuring that the system can accurately reflect changes in potential payouts in real-time. This may involve continuously updating the payout structures to mirror the current landscape, user strategies, and the latest performance data. As users apply these modifiers to their selections, the data store 310 may recalculate potential payouts, taking into account not only the base probabilities of the selected outcomes but also the modified difficulty profiles introduced by the user's choice of modifiers. This recalculation may ensure that the payout data remains relevant, precise, and reflective of the current gaming conditions, providing users with up-to-date information on their potential winnings.

Furthermore, the data store 310's handling of payout data 326 may enable the fantasy sports platform to maintain transparency and fairness in contest operations. By systematically adjusting payouts based on algorithms that account for the impact of difficulty modifiers, the platform may ensure that users are rewarded in proportion to the difficulty levels they choose. This adjustment may enhance the gaming experience by adding layers of strategic depth and financial decision-making and may foster a competitive environment where skill and insight are duly rewarded (e.g., based on how difficult it is to win the contest). The meticulous management and storage of payout data, therefore, may align the fantasy sports platform's economic model with the dynamic and strategic nature of fantasy sports contests.

Modifier data 328, stored within the data store 310 of the networked environment 300, may allow users to dynamically adjust the difficulty levels associated with their contest entries. The modifier data 328 may comprise detailed information on increased difficulty modifiers 112 ("Demons") and decreased difficulty modifiers 114 ("Goblins"), along with the rules and parameters that govern how these modifiers affect the potential payout. The inclusion of difficulty modifiers may introduce a strategic element to the contests, enabling users to tailor their gaming experience according to their strategic outlook. The storage of modifier data 328 may be comprehensive, capturing the classification and effect of each modifier, as well as the contextual rules and probabilities that dictate the application of these modifiers to the user's selections.

The architecture of the data store 310 may facilitate the organization and retrieval of modifier data 328, ensuring that the application of difficulty modifiers to user entries is both accurate and reflective of the current contest dynamics. The modifier data 328 may include algorithms and formulas used to calculate adjusted probabilities of outcomes based on the application of difficulty modifiers, thereby influencing the recalculated potential payouts. The impact of each difficulty modifier may be immediately reflected in the contest setup. As such, the data store 310 may accommodate rapid updates and modifications to the modifier data, allowing for the introduction of new modifiers or the adjustment of existing ones based on gameplay analytics and user feedback.

The management service 330, situated within the computing environment 302, may perform one or more functions to provide a seamless, engaging, and fair fantasy sports experience. The management service 330 may oversee the reception and processing of user submissions, including lineup selections and entry fees, and ensures the accurate calculation and distribution of contest outcomes and payouts. Moreover, the management service 330 may aggregate and analyze vast data sets related to contest dynamics, user behavior, and performance metrics, facilitating the system's decision-making processes and strategic direction. Furthermore, the management service 330 may be adaptive and scalable, capable of adjusting to fluctuations in user demand and contest complexity. This flexibility may allow the computing environment 302 to support an expanding array of fantasy sports contests, adapt to changes in sporting schedules, and incorporate new features or functionalities as the platform evolves.

The management service 330 may comprise one or more sub-services such as the communication service 332 and the processing service 334, each responsible for specific operational aspects. The communication service may ensure efficient data distribution and interaction within the networked environment, while the processing service 334 may handle the analytical and computational tasks necessary for the contest's execution.

The management service 330 may comprise a communication service 332 and a processing service 334. The communication service 332 may manage data exchanges between users' client devices, external resources, and internal computational processes. Moreover, the communication service 332 may ensure the timely and secure transmission of information, facilitating real-time interactions and access to up-to-date contest data, such as user registration details, player selections, and the outcomes of sporting events that influence contest results.

The processing service 334 within the computing environment 302 may execute a broad spectrum of analytical and computational duties associated with for the operation and enhancement of the platform. The processing service may comprise one or more specialized sub-services, including the projection service 336, entry fee service 338, payout service 340, and modifier service 342, each providing a specific aspect of the fantasy sports contest ecosystem. Cumulatively, these services may perform functions such as outcome prediction, selection assessment, modifier assessment, entry fee determination, payout determination, and the generation of insightful analytics. Through its comprehensive data processing capabilities, the processing service 334 enables the platform to offer personalized contest experiences, apply modifiers, and continuously enhance the platform based on user feedback and performance analytics.

The projection service 336 may perform analysis and valuation of projections made by user 102. Utilizing projections data 312, projection service 336 may evaluate the selections made by user 102, which may include a range of attributes such as player performance, game outcomes, and statistical milestones. The projection service 336 may aggregate the user selections and assesses the choices across various dimensions, including player form, team dynamics, and historical data, to determine a value for the projections by user 102. This value may reflect the expected performance level. Further, the projection service 336 may provide user 102 with insights into the potential outcomes of their fantasy selections. By assigning a projections value, the projection service 336 may allow user 102 to gauge the strength and potential success of their lineup choices relative to the real-world performances of athletes and teams.

The entry fee service 338 may determine the appropriate entry fee for participants in fantasy sports contests. This determination process may incorporate application of difficulty modifiers, including both increased difficulty modifiers 112 ("Demons") and decreased difficulty modifiers 114 ("Goblins"), to accurately reflect the added or reduced difficulty associated with a user's contest entry. The entry fee service 338 may utilize a sophisticated algorithm that analyzes the selected difficulty modifiers' impact on the potential outcomes of the contest entries.

The payout service 340 may determine the appropriate payouts for fantasy sports contests, including the application of difficulty modifiers, such as increased difficulty modifiers 112 ("Demons") and decreased difficulty modifiers 114 ("Goblins"). This payout service 340 may employ a detailed algorithm that may utilize the outcomes of user-selected projections and/or the impact of any applied difficulty modifiers on those projections. The difficulty modifiers may adjust the difficulty of achieving specific outcomes related to player performances within the contests. Increased difficulty modifiers 112 ("Demons") may elevate the challenge by setting higher performance thresholds, which, if surpassed, may result in significantly higher payouts due to the elevated difficulty of winning the contest involved. Conversely, decreased difficulty modifiers 114 ("Goblins") may lower these thresholds, making certain outcomes easier to achieve but may offer lower payouts to reflect the reduced difficulty.

One or more algorithms of the payout service 340 may integrate comprehensive data, including historical performance statistics of players, predictive analytics, and real-time performance data, to assess the adjusted probability of achieving the user-specified outcomes with the difficulty modifiers in play. This assessment may influence the calculation of payouts, ensuring that they are proportionate to the actual difficulty undertaken by the user. For example, a user applying one or more increased difficulty modifiers 112 ("Demon") to a player expected to score in a particularly challenging matchup may see a potential increase in payout, acknowledging the lower probability of occurrence. This dynamic adjustment may incentivize a wider array of strategies within the platform, making the fantasy sports contests more engaging and competitive.

Moreover, the payout service 340 may maintain transparency in how payouts are determined by providing users with detailed explanations of how difficulty modifiers affect their potential winnings. This approach may ensure that users are well-informed about the mechanics behind their contest entries, fostering a sense of fairness and clarity. The service's reliance on accurate and up-to-date modifier information, combined with its sophisticated analytical capabilities, may ensure that payouts are not only fair but also reflective of the unique configurations of each contest entry. Consequently, the payout service 340 may play a role in promoting a balanced and enjoyable gaming experience, encouraging users to explore various strategic avenues through the judicious application of difficulty modifiers.

The modifier service 342 may manage the operational aspects of difficulty modifiers, specifically increased difficulty modifiers 112 ("Demons") and decreased difficulty modifiers 114 ("Goblins"). This modifier service 342 may determine the availability of these modifiers based on a variety of factors, including the specific context of each fantasy sports contest, player performance statistics, and prevailing market conditions. By analyzing current and historical data, the modifier service 342 may ensure that difficulty modifiers are offered to users in a manner that maintains the competitive balance and integrity of the contests. The availability of these modifiers may be dynamically adjusted to reflect real-time changes in player conditions, game circumstances, and other relevant factors that could impact the assessment of applying a particular modifier.

Moreover, the modifier service 342 may assess the appropriate statistics associated with each modifier. The modifier service 342 may perform a deep analysis of how applying a "Demon" or "Goblin" modifier to a player's performance projection could alter the expected outcome. For instance, a "Demon" modifier may increase the projected points a player must score in a game to achieve a higher payout, while a "Goblin" modifier may decrease the threshold, making it easier to win but with a lower payout. The modifier service 342 may calculate these adjustments based on a complex algorithm that factors in player performance trends, historical matchups data, and statistical probabilities. This may ensure that the application of modifiers is grounded in logical, data-driven analysis, providing users with meaningful choices that influence their strategy and potential winnings.

Furthermore, the modifier service 342 may synthesize information to recalibrate e potential payouts in accordance with the added or reduced difficulty provided by the modifiers. The modifier service 342 may ensure that the financial aspects of contest participation (e.g., entry fees and potential winnings) are directly aligned with the strategic decisions made by users, including their choice of difficulty modifiers. Through its comprehensive functionality, the modifier service 342 may facilitate a more engaging, nuanced, and potentially rewarding fantasy sports experience, encouraging users to thoughtfully consider the impact of their behaviors on both their strategy and financial outcomes.

Figure 4:
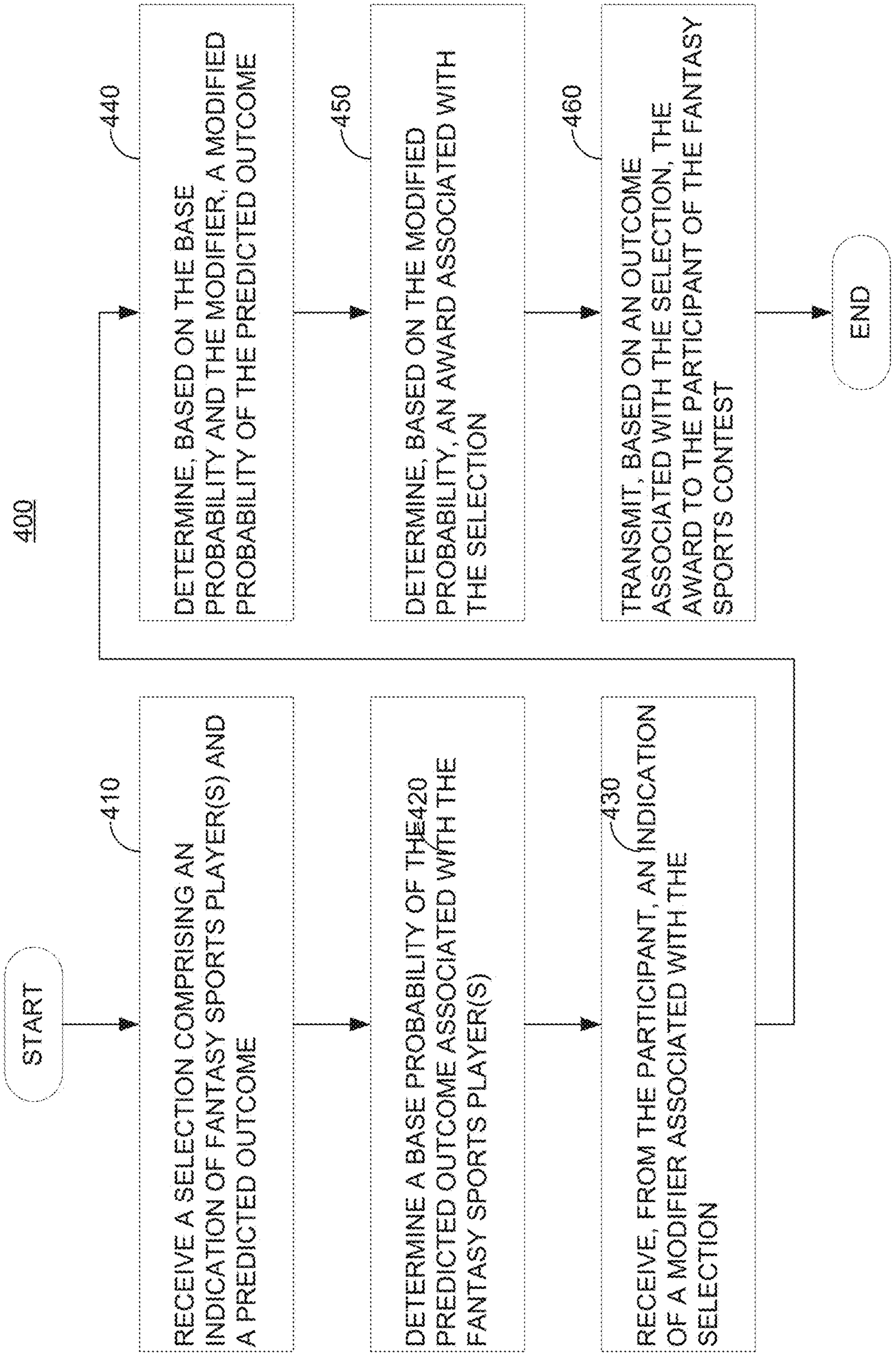
FIG. 4 illustrates an exemplary process for dynamically adjusting the pricing and associated payouts of fantasy sports player picks by applying strategic modifiers according to various embodiments of the present disclosure.

Referring now to FIG. 4, illustrated is a flowchart of a process 400, according to one example of the disclosed systems and processes. The process 400 may demonstrate a technique for dynamically adjusting the pricing and associated payouts of fantasy sports player picks by applying strategic modifiers. The process 400 may further demonstrate a technique for determining pricing by applying the strategic modifiers.

At box 410, the process 400 may include receiving, from a participant of a fantasy sports contest, a selection comprising an indication of one or more fantasy sports players and a predicted outcome associated with the one or more fantasy sports players. The player selection interface 104, depicted in FIG. 1, may serve as a portal through which user 102 may engage with the platform. The player selection interface 104 may support a wide variety of strategic decisions, ranging from the selection of fantasy sports players (e.g., labeled as 106*a* through 106*n*) from diverse sporting events across multiple leagues, to determining specific outcomes for these players. An example includes users deciding whether an NFL quarterback will achieve more or less than a predetermined number of touchdowns in a forthcoming game.

The incorporation of a predicted outcome in conjunction with player selection introduces a multifaceted layer to the contest, encouraging participants to leverage their knowledge of sports and player performance in a manner that extends beyond conventional team composition. This aspect of process 400 represents an innovation in fantasy sports gaming, positioning it at the confluence of strategic prediction and sports enthusiasm. Participants may be prompted to analyze player statistics, recent performances, and potential game dynamics to make informed decisions, thereby deepening their engagement with the contest. This predictive aspect may amplify the excitement inherent in fantasy sports and may challenge participants to employ a nuanced understanding of the sports and athletes involved.

The selection process may establish parameters within which the fantasy sports contest. By requiring participants to submit their selections and associated predicted outcomes, the system ensures that each entry is rooted in a combination of strategic choice and prognostic assessment. Receiving selections and predicted outcomes may facilitate subsequent analytical and computational processes, e.g., dynamic adjustment of pricing and payouts.

For example, a participant of a fantasy sports contest may select, via the player selection interface 104, Jalen Brunson, an NBA player. Moreover, the participant may select an outcome of Jalen Brunson scoring more than 6.5 rebounds in an upcoming game.

At box 420, the process 400 may include determining a base probability of the predicted outcome associated with the one or more fantasy sports players. The base probability may provide a metric upon which subsequent modifications and strategic considerations are applied, reflecting the intrinsic likelihood of a particular event's occurrence before the application of external modifiers.

The base probability may be determined by a comprehensive analysis of a multitude of factors including, but not limited to, historical performance data, current season statistics, and real-time information about player conditions. Moreover, the base probability may (e.g., accurately and in real-time) reflect the current state of play, incorporating both the legacy of past performances and the immediacy of present conditions. For example, live game events may be integrated into a computational model.

Moreover, machine learning may be utilized to enhance predictive accuracy over time by determining the base probability based on past user selections and outcomes. Through the aggregation and analysis of user interaction data, patterns and trends that influence the base probability may be identified, thereby continuously improving the fantasy sport platform's predictive capabilities.

The base probability may influence participants' decision-making processes, guiding them in the selection of players and the application of strategic modifiers. The transparent presentation of this probability, and its subsequent modifications, via a user interface may empower participants to make informed choices, fostering an environment of strategic engagement and competitive play.

For example, determining the base probability of Jalen Brunson scoring more than 6.5 rebounds may include collecting real-time and historical data on Jalen Brunson's performances (e.g., past or present), outcomes, and/or market data. A regression analysis may be across the data sources to determine the expected true price for Jalen Brunson to have more than 6.5 rebounds. Moreover, probabilities and/or one or more algebraic equations may be used to determine, based on the expected true price, a true independent probability of Jalen Brunson scoring more than 6.5 rebounds.

At box 430, the process 400 may include receiving, from the participant, an indication of a modifier associated with the selection. Participants, having selected one or more fantasy sports players along with a predicted outcome for these players, may influence the dynamics of their participation through the selection of a modifier. This modifier may alter the base probability of the predicted outcome, thereby affecting both the difficulty to win and the potential payout components of the contest.

By choosing a modifier, the participant may signal an intent to tailor their engagement in accordance with a perceived understanding of the game, player performances, and potential outcomes. Accordingly, box 430 may signify a departure from static fantasy sports contests or selection mechanisms, ushering in a dynamic engagement model where participants have a hand in molding their contest trajectory. Depending on the nature of the modifier-whether it increases or decreases the difficulty associated with the predicted outcome-participants may be afforded an opportunity to calibrate their difficulty tolerance against the potential payout. This calibration is not arbitrary but informed by a myriad of factors, including player statistics, historical performances, and real-time game developments, which participants may navigate to make judicious selections.

The inclusion of a modifier also underscores the system's adaptability to participant preferences and strategies. By facilitating the selection of modifiers, the system acknowledges and accommodates diverse participant engagement styles, from the conservative to the audacious. This adaptability may enrich the contest environment, making it appealing to a broad spectrum of fantasy sports enthusiasts.

For example, the participant may feel very confident about Jalen Brunson's upcoming performance and may select an increased difficulty modifiers (a "Demon") for their selection of Jalen Brunson to score more than 6.5 rebounds.

At box 440, the process 400 may include determining, based on the base probability and the modifier, a modified probability of the predicted outcome. Box 440 may determine a modified probability of a predicted outcome, integrating user-selected modifiers with the base probability of fantasy sports player performance predictions. Modifiers, which may either heighten or mitigate the difficulty and/or the potential payout associated with the predicted outcome, may be applied to the base probability to yield a modified probability. This modified probability may tailor the gaming experience to individual user preferences and strategies, allowing users to calibrate their lineup selection in pursuit of higher potential payouts at a higher difficulty of winning the contest or lower potential payouts with a lesser difficulty of winning the contest.

Determining the modified probability may comprise a complex interplay of algorithms that take into account the selected modifier's nature and impact. Increased difficulty modifiers ("Demons"), for instance, may elevate the challenge by enhancing the difficulty of achieving the predicted outcome, potentially leading to higher rewards. Conversely, decreased difficulty modifiers ("Goblins") may lower the difficulty, aligning with a user's preference for a more conservative approach. By enabling users to influence the difficulty equation through their selections and modifiers, the system fosters a more interactive, strategic, and personalized gaming experience.

For example, when calculating any correlation ratios within the participant's entry for Jalen Brunson to score 6.5 rebounds with a Demon modifier, historical data for all positions and stat types in the NBA over several years may be used to calculate a matrix of correlation ratios for all more and less outcomes between every stat type and position. The exact approach to calculating the correlations may vary by sport, stay type, position and other factors. Moreover, a distribution of outcomes may be determined by applying probability theory and conditional probabilities to generate a joint probability distribution of outcomes that combines the probabilities of all the selections in the lineup (e.g., one or more other selections besides the selection of Jalen Brunson to score 6.5 rebounds).

At box 450, the process 400 may include determining, based on the modified probability, an award (e.g., a payout) associated with the selection. One or more algorithms may synthesize various data points, including player performance statistics, historical data, real-time events, and the user's strategic interventions via modifiers, to formulate a revised outlook on the potential award (e.g., potential payout). This dynamic adjustment of the award (e.g., payout), rooted in the modified probability, may exemplify the system's capability to offer a bespoke gaming experience tailored to the user's strategic preferences. Moreover, the dynamic adjustment may underscore the system's innovative approach to enhancing the engagement and satisfaction of participants by enabling them to directly influence their lineup preferences through their selections and applied modifiers.

Furthermore, the determination of the award (e.g., payout) at box 450 may encapsulate the system's holistic approach to fantasy sports gaming, where strategic depth, financial decision-making, and real-time analytics converge may facilitate a richly interactive and immersive user experience. By factoring in the modified probability to determine the award (e.g., payout), the system may ensure fairness and competitiveness and may instill a sense of agency among users, empowering them to shape their contest outcomes through informed decisions and strategic plays.

For example, a payout may be calculated by applying linear optimization for the participant's selection of Jalen Brunson to score 6.5 rebounds, with a Demon modifier, Moreover, the payout offered to the user may be maximized while satisfying one or more constraints, such as the expected margin generated from that lineup based on the joint probability distribution function calculated in the step above.

At box 460, the process 400 may include transmitting, based on an outcome associated with the selection, the award (e.g., payout) to the participant of the fantasy sports contest. The determined award (e.g., payout) may be transmitted to the participant based on the outcome associated with the participant's selection, e.g., the fantasy sports players chosen, and the predicted outcome related to these players. Transmission of the award (e.g., payout) may be a direct consequence of the intricate calculations and selections made by the participant throughout their engagement with the fantasy sports contest, facilitated by the system's computational and analytical capabilities.

Figure 5:
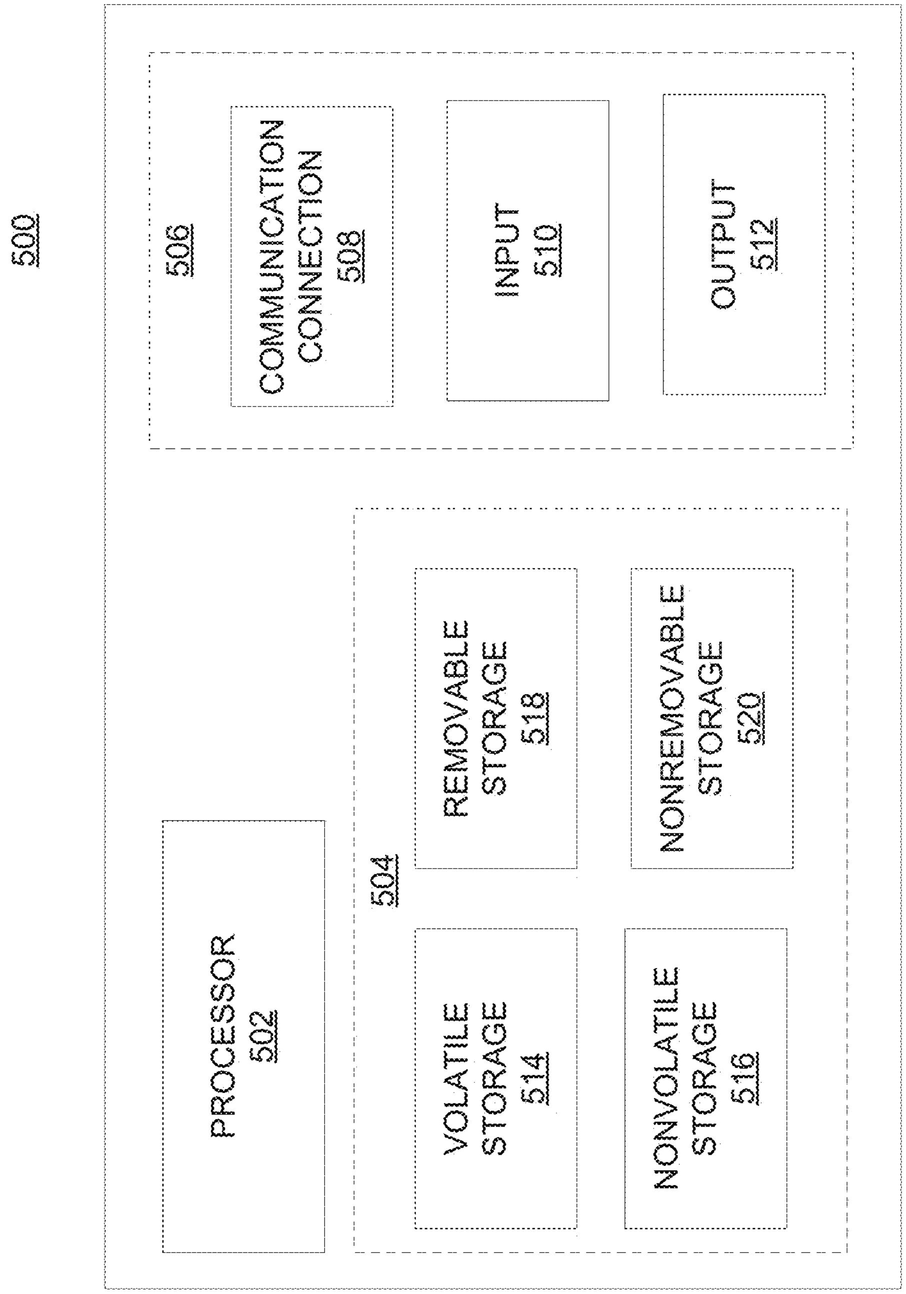
FIG. 5 illustrates a schematic of an exemplary device according to various embodiments of the present disclosure.

FIG. 5 is a block diagram of a computing device 500 that may be connected to or comprise a component of environment 200. Computing device 500 may comprise hardware or a combination of hardware and software. The functionality to facilitate fantasy sports contests may reside in one or a combination of computing devices 500. Computing device 500 depicted in FIG. 5 may represent or perform functionality of an appropriate computing device 500, or a combination of computing devices 500, such as, for example, a component or various components of a fantasy sports contest system, a computing device, a processor, a server, a gateway, a database, a firewall, a router, a switch, a modem, an encryption tool, a virtual private network (VPN), a network access control (NAC) device, a secure web gateway, or the like, or any appropriate combination thereof. It is emphasized that the block diagram depicted in FIG. 5 is exemplary and not intended to imply a limitation to a specific example or configuration. Thus, computing device 500 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Computing device 500 may comprise a processor 502 and a memory 504 coupled to processor 502. Memory 504 may contain executable instructions that, when executed by processor 502, cause processor 502 to effectuate operations associated with a fantasy sports contest. As evident from the description herein, computing device 500 is not to be construed as software per se.

In addition to processor 502 and memory 504, computing device 500 may include an input/output system 506. Processor 502, memory 504, and input/output system 506 may be coupled together (coupling not shown in FIG. 5) to allow communications between them. Each portion of computing device 500 may comprise circuitry for performing functions associated with each respective portion. Thus, each portion may comprise hardware, or a combination of hardware and software. Accordingly, each portion of computing device 500 is not to be construed as software per se. Input/output system 506 may be capable of receiving or providing information from or to a communications device or other network entities configured for fantasy sports contests. For example, input/output system 506 may include a wireless communication (e.g., 3G/4G/5G/GPS) card. Input/output system 506 may be capable of receiving or sending video information, audio information, control information, image information, data, or any combination thereof. Input/output system 506 may be capable of transferring information with computing device 500. In various configurations, input/output system 506 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 506 may comprise a Wi-Fi finder, a two-way GPS chipset or equivalent, or the like, or a combination thereof.

Input/output system 506 of computing device 500 also may contain a communication connection 508 that allows computing device 500 to communicate with other devices, network entities, or the like. Communication connection 508 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 506 also may include an input device 510 such as keyboard, mouse, pen, voice input device, or touch input device. Input/output system 506 may also include an output device 512, such as a display, speakers, or a printer.

Processor 502 may be capable of performing functions associated with fantasy sports contests, such as functions for applying strategic modifiers, as described herein. For example, processor 502 may be capable of, in conjunction with any other portion of computing device 500, dynamically adjusting the pricing and associated payouts of fantasy sports player picks by applying strategic modifiers, as described herein.

Memory 504 of computing device 500 may comprise a storage medium having a concrete, tangible, physical structure. As is known, a signal does not have a concrete, tangible, physical structure. Memory 504, as well as any computer-readable storage medium described herein, is not to be construed as a signal. Memory 504, as well as any computer-readable storage medium described herein, is not to be construed as a transient signal. Memory 504, as well as any computer-readable storage medium described herein, is not to be construed as a propagating signal. Memory 504, as well as any computer-readable storage medium described herein, is to be construed as an article of manufacture.

Memory 504 may store any information utilized in conjunction with fantasy sports contests. Depending upon the exact configuration or type of processor, memory 504 may include a volatile storage 514 (such as some types of RAM), a nonvolatile storage 516 (such as ROM, flash memory), or a combination thereof. Memory 504 may include additional storage (e.g., a removable storage 518 or a non-removable storage 520) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by computing device 500. Memory 504 may comprise executable instructions that, when executed by processor 502, cause processor 502 to effectuate operations associated with fantasy sports contests.

Figure 6:
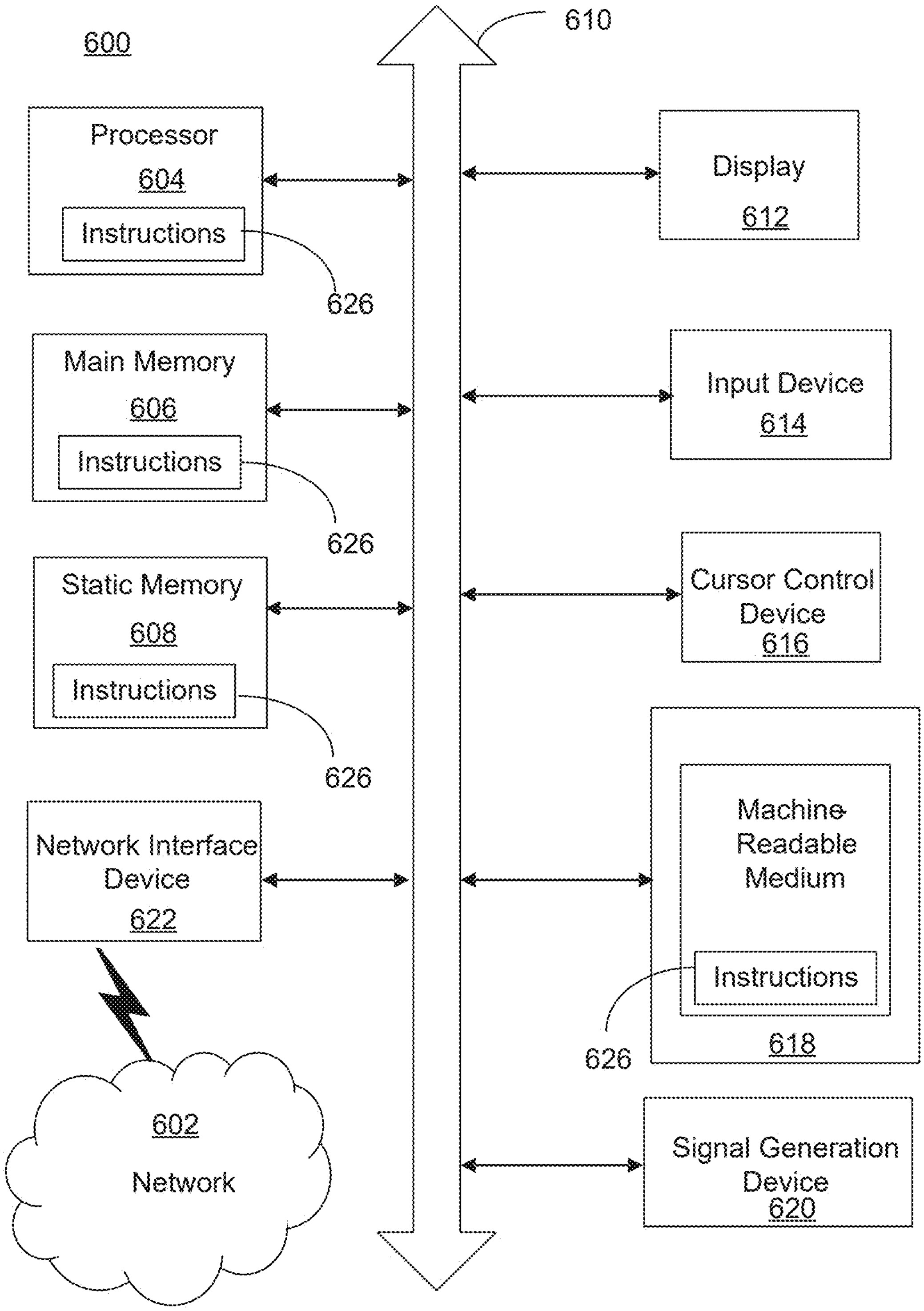
FIG. 6 illustrates an exemplary diagrammatic representation of a machine in the form of a computer system according to various embodiments of the present disclosure.

FIG. 6 depicts an exemplary diagrammatic representation of a machine in the form of a computer system 600 within which a set of instructions, when executed, may cause the machine to perform any one or more of the methods described above. One or more instances of the machine can operate, for example, as computing device 500, processor 502, server 204, database 206, and other devices of FIGS. 1-5. In some examples, the machine may be connected (e.g., using a network 602) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 600 may include a processor (or controller) 604 (e.g., a central processing unit (CPU)), a graphics processing unit (GPU, or both), a main memory 606 and a static memory 608, which communicate with each other via a bus 610. The computer system 600 may further include a display unit 612 (e.g., a liquid crystal display (LCD), a flat panel, or a solid-state display). Computer system 600 may include an input device 614 (e.g., a keyboard), a cursor control device 616 (e.g., a mouse), a disk drive unit 618, a signal generation device 620 (e.g., a speaker or remote control) and a network interface device 622. In distributed environments, the examples described in the subject disclosure can be adapted to utilize multiple display units 612 controlled by two or more computer systems 600. In this configuration, presentations described by the subject disclosure may in part be shown in a first of display units 612, while the remaining portion is presented in a second of display units 612.

The disk drive unit 618 may include a tangible computer-readable storage medium on which is stored one or more sets of instructions (e.g., instructions 626) embodying any one or more of the methods or functions described herein, including those methods illustrated above. Instructions 626 may also reside, completely or at least partially, within main memory 606, static memory 608, or within processor 604 during execution thereof by the computer system 600. Main memory 606 and processor 604 also may constitute tangible computer-readable storage media.

While examples of a system for fantasy sports contests have been described in connection with various computing devices/processors, the underlying concepts may be applied to any computing device, processor, or system capable of facilitating a fantasy sports contest. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer readable storage medium is not a propagating signal. A computer-readable storage medium as described herein is an article of manufacture. When the program code is loaded into and executed by a machine, such as a computer, the machine becomes a device for fantasy sports contests. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language and may be combined with hardware implementations.

The methods and devices associated with fantasy sports contests as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an erasable programmable read-only memory (EPROM), a gate array, a programmable logic device (PLD), a client computer, or the like, the machine becomes a device for implementing fantasy sports contests as described herein. When implemented on a general-purpose processor, the program code combines with the processor to provide a unique device that operates to invoke the functionality of a fantasy sports contest.

While the disclosed systems have been described in connection with the various examples of the various figures, it is to be understood that other similar implementations may be used, or modifications and additions may be made to the described examples of a fantasy sports contest system without deviating therefrom. For example, one skilled in the art will recognize that a fantasy sports contest system as described in the instant application may apply to any environment, whether wired or wireless, and may be applied to any number of such devices connected via a communications network and interacting across the network. Therefore, the disclosed systems as described herein should not be limited to any single example, but rather should be construed in breadth and scope in accordance with the appended claims.

In describing preferred methods, systems, or apparatuses of the subject matter of the present disclosure-dynamically adjusting the pricing and associated payouts of fantasy sports player picks by applying strategic modifiers—as illustrated in the Figures, specific terminology is employed for the sake of clarity. The claimed subject matter, however, is not intended to be limited to the specific terminology so selected. In addition, the use of the word "or" is generally used inclusively unless otherwise provided herein.

This written description uses examples to enable any person skilled in the art to practice the claimed subject matter, including making and using any devices or systems and performing any incorporated methods. Other variations of the examples are contemplated herein.

What is claimed is:

1. One or more computing devices, comprising one or more processors and a memory storing executable instructions, wherein the one or more processors are configured to:

access, from the memory, historical data comprising performance data associated with each of one or more fantasy sports players;

present, via a graphical user interface (GUI), an interactive selection menu enabling a participant of a fantasy sports contest to select one or more fantasy sports players and a predicted outcome associated with the one or more fantasy sports players;

display, via the GUI, a real-time probability indicator for the predicted outcome, wherein the probability indicator is dynamically generated based on real-time data received from an external sports data feed;

receive, via the GUI, a selection of one or more payout modifiers, wherein each payout modifier affects a probability calculation of the predicted outcome;

adjust, using a statistical analysis model a stored in the memory, a base probability of the predicted outcome, wherein the base probability is determined based on the historical data, the real-time data, and the one or more payout modifiers;

update, within the memory, a profile record associated with the participant, wherein the profile record comprises the selected fantasy sports players, the predicted outcome, the one or more payout modifiers, and the adjusted probability;

display, via the GUI, an updated award payout reflecting the one or more payout modifiers and the adjusted probability, wherein the GUI dynamically refreshes in real-time based on new data inputs; and display, based on an outcome associated with the selection, the updated award payout to the participant via the GUI.

2. The one or more computing devices of claim 1, wherein the one or more processors are further configured to receive, from the participant, an indication of a plurality of selection modifiers associated with the selection, wherein the modified probability is based on each of the plurality of selection modifiers.

3. The one or more computing devices of claim 1, wherein the historical data comprises an indication of player condition.

4. The one or more computing devices of claim 1, wherein the base probability is adjusted using machine learning based on past user selections and associated past outcomes.

5. A method performed by one or more computing devices, the method comprising:

accessing, from a memory, historical data comprising performance data associated with each of one or more fantasy sports players;

presenting, via a graphical user interface (GUI), an interactive selection menu enabling a participant of a fantasy sports contest to select one or more fantasy sports players and a predicted outcome associated with the one or more fantasy sports players;

displaying, via the GUI, a real-time probability indicator for the predicted outcome, wherein the probability indicator is dynamically generated based on real-time data received from an external sports data feed;

receiving, via the GUI, a selection of one or more payout modifiers, wherein each payout modifier affects a probability calculation of the predicted outcome;

adjusting, using a statistical analysis model stored in the memory, a base probability of the predicted outcome, wherein the base probability is determined based on the historical data, the real-time data, and the one or more payout modifiers;

updating, within the memory, a profile record associated with the participant, wherein the profile record comprises the selected fantasy sports players, the predicted outcome, the one or more payout modifiers, and the adjusted probability;

displaying, via the GUI, an updated award payout reflecting the one or more payout modifiers and the adjusted probability, wherein the GUI dynamically refreshes in real-time based on new data inputs; and displaying, based on an outcome associated with the selection, the updated award payout to the participant via the GUI.

6. The method of claim 5, further comprising receiving, from the participant, an indication of a plurality of selection modifiers associated with the selection, wherein the modified probability is based on each of the plurality of selection modifiers.

7. The method of claim 5, wherein the historical data comprises an indication of player condition.

8. The method of claim 5, wherein the base probability is adjusted using machine learning based on past user selections and associated past outcomes.

9. A system comprising:

one or more processors; and a memory coupled with the one or more processors, the memory storing executable instructions that when executed by the one or more processors cause the one or more processors to effectuate operations comprising:

accessing, from the memory, historical data comprising performance data associated with each of one or more fantasy sports players;

presenting, via a graphical user interface (GUI), an interactive selection menu enabling a participant of a fantasy sports contest to select one or more fantasy sports players and a predicted outcome associated with the one or more fantasy sports players;

displaying, via the GUI, a real-time probability indicator for the predicted outcome, wherein the probability indicator is dynamically generated based on real-time data received from an external sports data feed;

receiving, via the GUI, a selection of one or more payout modifiers, wherein each payout modifier affects a probability calculation of the predicted outcome;

adjusting, using a statistical analysis model stored in the memory, a base probability of the predicted outcome, wherein the base probability is determined based on the historical data, the real-time data, and the one or more payout modifiers;

updating, within the memory, a profile record associated with the participant, wherein the profile record comprises the selected fantasy sports players, the predicted outcome, the one or more payout modifiers, and the adjusted probability;

displaying, via the GUI, an updated award payout reflecting the one or more payout modifiers and the adjusted probability, wherein the GUI dynamically refreshes in real-time based on new data inputs; and displaying, based on an outcome associated with the selection, the updated award payout to the participant via the GUI.

10. The system of claim 9, wherein the operations further comprise receiving, from the participant, an indication of a plurality of selection modifiers associated with the selection, wherein the modified probability is based on each of the plurality of selection modifiers.

11. The system of claim 9, wherein the operations further comprise determining, based on the modified probability, an entry fee associated with the selection.

12. The system of claim 9, wherein the base probability is adjusted using machine learning based on past user selections and associated past outcomes.

* * * * *